I. B. CESSNA.
TRAILER HITCH FOR AUTOMOBILES.
APPLICATION FILED DEC. 15, 1921.

1,427,579.

Patented Aug. 29, 1922.

WITNESSES

INVENTOR
I. B. Cessna,
BY
ATTORNEYS

UNITED STATES PATENT OFFICE.

IRA BENJAMIN CESSNA, OF HOISINGTON, KANSAS.

TRAILER HITCH FOR AUTOMOBILES.

1,427,579.  Specification of Letters Patent.  Patented Aug. 29, 1922.

Application filed December 15, 1921. Serial No. 522,534.

*To all whom it may concern:*

Be it known that I, IRA B. CESSNA, a citizen of the United States, and a resident of Hoisington, in the county of Barton and State of Kansas, have invented certain new and useful Improvements in Trailer Hitches for Automobiles, of which the following is a specification.

My present invention relates generally to automobiles, and more particularly to a well known type of machine whose differential housing and adjacent parts are so arranged and constructed as to lend themselves to the ready, rigid and permanent connection of a bar apertured for the receipt of flexible or other connections from a trailing vehicle, my object being the provision of a simple inexpensive form of hitch which may be readily connected to the differential housing so as to form a more or less permanent part thereof without danger of interference with other parts of the machine.

Figure 1:
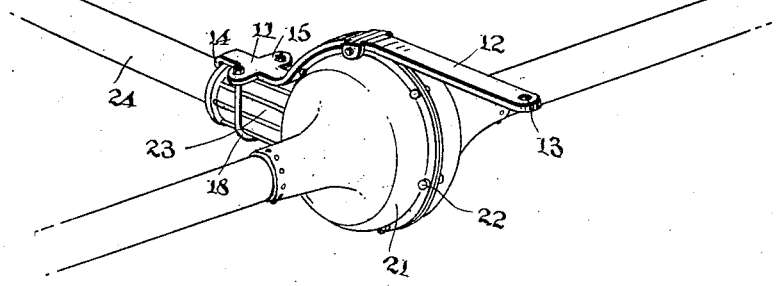
Figure 2:
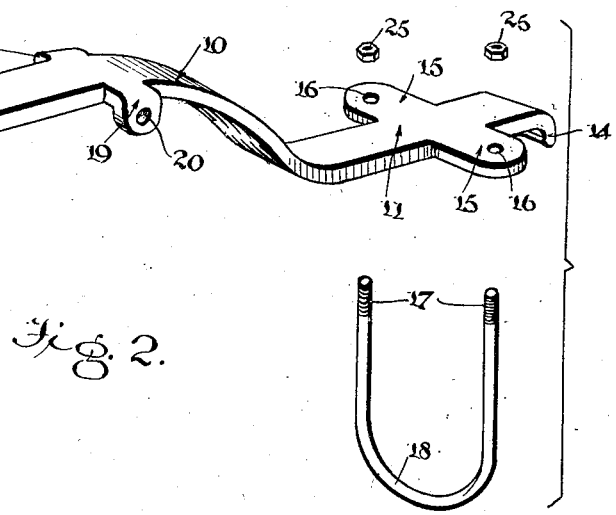

In the accompanying drawing which illustrates my present invention and forms a part of this specification, Figure 1 is a perspective view illustrating the practical application of my invention, and Figure 2 is a detail perspective view of my improved hitch with the several parts thereof in detached relation.

Referring now to these figures and particularly to Figure 2 my invention proposes a trailer hitch consisting of a bar generally indicated at 10 having its forward straight portion 11 offset by an intermediate double bend with respect to its rear straight portion 12, the latter of which is apertured as at 13 at its rear end to receive flexible or other connections leading from a trailing vehicle.

The forward straight end 11 which in the practical application of the invention extends in a plane below that of the rear straight portion 12, has a downturned lip 14 at its forward end and is provided adjacent to said lip with flatwise outstanding and oppositely disposed ears 15, the latter apertured as at 16 to receive the threaded ends 17 of a clamping U-bolt 18. Somewhat similar ears 19 outstand from the forward end of the rear straight portion 12 of the bar, but these latter ears 19 while apertured as at 20 to receive a clamping bolt, are downturned so that their apertures 20 aline with one another transversely of and below the adjacent portion of the bar.

In use the device is placed upon the differential housing 21 of a well known type of automobile whose housing is in two laterally abutting flanged sections, the flanges being connected by a circumferential series of transversely disposed clamping bolts 22, and the bar is placed so that its apertured ears 19 coincide with certain of the flange openings receiving one of the bolts 22 at the upper portion of the housing. The respective clamping bolt 22 is removed and a somewhat longer bolt substituted which will not only pass through the flanges but also through the apertures 20 of the ears 19. When so connected to the differential housing 21, the bar 10 will be disposed so that its intermediate curved portion follows the curvature of the forward portion of the differential housing 21 with its forward straight portion overlying the roller bearing housing 23 and with its forward downturned lip 14 engaging the forwardly presented annular shoulder formed by the forward end of the roller bearing housing 23 around the propeller shaft tube 24. In this position the forward side ears 15 outstand to an extent sufficient to permit the U-bolt 18 to embrace the roller bearing housing so that the nuts 25 when applied to the threaded ends 17 extending through the openings 16 and above the ears 15 will securely fasten the forward portion of the bar 10 in place.

It is obvious from the foregoing that the rear flat portion 12 of the bar when in the effective position shown in Figure 1 extends rearwardly beyond the differential housing 21 for a short distance sufficient to permit of readily attaching trailer connections thereto and yet it is obvious that the hitch as provided for by my invention may remain permanently in place when once installed and for use when the occasion arises, without danger of interference with other parts.

I claim:

1. A trailer hitch for automobiles having a differential housing and a roller bearing housing extending forwardly from the differential housing and forming an annular shoulder at its forward end, said hitch consisting of a bar apertured at its rear end and having a downturned forward end engaging the said shoulder, and a clip connected to the bar and embracing the roller bearing housing, said bar having portions intermediate its ends engaged by the fastening means of the differential housing.

2. A trailer hitch for automobiles having a differential housing and a roller bearing housing, the former provided with abutting flanges and connecting bolts through the flanges and the latter extending forwardly from the differential housing and forming an annular shoulder at its forward end, said hitch consisting of a bar having a straight rear portion apertured at its rear end and provided at its forward end with downturned side ears adapted to embrace the connected flanges of the differential housing and apertured to receive certain of the connecting bolts thereof, said bar having its intermediate portion curved to follow the curvature of the differential housing and having a forward straight portion overlying the roller bearing housing and provided at its forward end with a downturned lip engaging the said shoulder, said forward straight portion also having laterally extended side ears provided with apertures, and a clamping U-bolt embracing the roller bearing housing having its ends secured through the apertures of the last mentioned ears as described.

3. A trailer hitch for automobiles consisting of a bar having a double bend intermediate its ends, that portion of the bar at one side of its double bend having an aperture at its extremity and oppositely disposed laterally projecting and downturned ears provided with apertures, the other portion of the bar having a downturned extremity and having flatwise projecting oppositely disposed side ears, and a clamping U-bolt for cooperation with the last mentioned ears as described.

IRA BENJAMIN CESSNA.